(12) United States Patent
Shirakura (10) Patent No.: US 7,784,951 B2
(45) Date of Patent: Aug. 31, 2010

(54) ELECTRONIC INSTRUMENT AND USB DEVICE

(75) Inventor: Kiyomasa Shirakura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 892 days.

(21) Appl. No.: 11/656,098

(22) Filed: Jan. 22, 2007

(65) Prior Publication Data

US 2007/0177114 A1 Aug. 2, 2007

(30) Foreign Application Priority Data

Jan. 27, 2006 (JP) ............................. 2006-019204

(51) Int. Cl.
*G03B 21/14* (2006.01)
(52) U.S. Cl. ..................................................... 353/119
(58) Field of Classification Search ................. 353/119, 353/122
See application file for complete search history.

(56) References Cited

U.S. PATENT DOCUMENTS 6,886,948 B2    5/2005   Nakano

2006/0061733 A1 *  3/2006  Kuhlmann et al. ............. 353/30
2006/0082733 A1 *  4/2006  Saito ........................... 353/69
2007/0070308 A1 *  3/2007  Chen ........................... 353/119

FOREIGN PATENT DOCUMENTS

| CN | 1434346 A | 8/2003 |
| CN | 1936691 | 3/2007 |
| JP | 05-173669 A | 7/1993 |
| JP | 09-330148 A | 12/1997 |
| JP | 10-049259 A | 2/1998 |
| JP | 11-238105 A | 8/1999 |
| JP | 2003-215702 A | 7/2003 |
| JP | 2004-021218 A | 1/2004 |
| JP | 3112106 U | 6/2005 |
| JP | 2005-197909 A | 7/2005 |
| JP | 2006-011116 A | 1/2006 |

* cited by examiner

*Primary Examiner*—William C Dowling
(74) *Attorney, Agent, or Firm*—AdvantEdge Law Group, LLC (57) ABSTRACT

An electronic instrument includes: an apparatus body which processes information received from a USB device connected thereto; and a housing which houses the apparatus body in an interior, wherein a step sinking in toward an interior of the housing is formed in an outer peripheral surface of the housing, and the step is provided with a USB connecting terminal to which the USB device is connected along the surface of the housing in which the step is formed.

7 Claims, 6 Drawing Sheets

ELECTRONIC INSTRUMENT AND USB DEVICE

BACKGROUND

1. Technical Field

The present invention relates to an electronic instrument including an apparatus body which processes information received from a USB device connected thereto, and a housing which houses the apparatus body in an interior, and to the USB device used for the electronic instrument.

2. Related Art

To date, as an electronic instrument, a projector has been known which includes a light source, an optical modulator which forms an optical image by modulating a luminous flux emitted from the light source, an apparatus body including a projection optical system which projects the formed optical image, and a housing which houses the apparatus body in an interior. This kind of projector is configured in such a way as to be capable of forming an optical image corresponding to image information received from an exterior, and projecting the optical image onto a screen or the like by means of a projection optical system.

As this kind of projector, a projector has been proposed which can be connected to a device which transmits image information (for example, refer to JP-A-2003-215702, page 4, FIG. 2). In the projector described in JP-A-2003-215702, a plurality of connecting terminals (connectors) are provided in an interface exposed on a housing back surface, and individual devices are connected to the connecting terminals via a cable or the like. Then, the projector projects an optical image corresponding to image information received from the individual devices.

At this point, a large number of the heretofore described kinds of device have been proposed which transmit information such as the image information and, particularly, there is an increasing frequency in a use of a compact and portable USB (Universal Serial Bus) device. As this kind of USB device, not only a USB device which stores the image information or the like as a file, but also a USB device equipped with a module capable of a communication connection to another device has been devised. Then, as this kind of portable USB device, a large number of kinds of USB device have also been proposed which can be connected directly to the connecting terminal of the projector without an intermediate such as the cable.

Recently, the projector has been reduced in size and weight, and there have been increasing cases in which it is not installed in a prescribed place, but is carried along and used in a desired place. At this point, in the case in which the projector is carried along, when the heretofore described compact USB device which can be connected directly to it is connected to the connecting terminal provided in the projector described in JP-A-2003-215702 and exposed to an outer side, the relevant USB device projects from the projector. For this reason, when trying to carry the projector along with the USB device connected thereto, there is a problem in that the USB device becomes impeditive, reducing a portability of the projector.

This kind of problem occurs not only in the projector, but also similarly in an electronic instrument, such as a laptop PC (Personal Computer) equipped with a USB connecting terminal and a portable printer which can directly print image information stored in the USB device.

SUMMARY

An advantage of some aspects of the invention is to provide an electronic instrument which, even when a USB device is connected thereto, can prevent the portability from being impaired, and the USB device.

In order to achieve the advantage, an electronic instrument according to an aspect of the invention includes: an apparatus body which processes information received from a USB device connected thereto; and a housing which houses the apparatus body in an interior. A step sinking in toward an interior of the housing is formed in an outer peripheral surface of the housing, and the step is provided with a USB connecting terminal to which the USB device is connected along the surface of the housing in which the step is formed.

According to the aspect of the invention, the step is formed in the housing configuring the electronic instrument, and the step is provided with the USB connecting terminal to which the USB device is connected. For this reason, the USB device fits in the step in a condition in which the USB device is connected to the USB connecting terminal along the housing. As such, it is possible to prevent the USB device connected to the USB connecting terminal from projecting from the electronic instrument. Consequently, as it is possible, even in the case in which the USB device is connected, to keep the USB device from becoming impeditive during a carrying about of the electronic instrument, it is possible to restrict the portability of the electronic instrument from being impaired.

It is preferable that a sidewall extending along a connection direction of the USB device is formed, adjacent to the step, on the outer peripheral surface of the housing in which the step is formed.

According to the aspect of invention, by the sidewall being formed on a surface of the step along the connection direction of the USB device, in the case in which the USB device is connected to the USB connecting terminal, as well as it being possible to protect the USB device, it is possible to prevent the USB device from dropping off abruptly. Also, in the event that a height of the sidewall from the step is higher than a height of the USB device connected to the USB connecting terminal from the step, it is possible not only to more reliably protect the USB device, but to reliably prevent the USB device from projecting from the housing. Consequently, it is possible to reliably prevent the portability of the electronic instrument from being impaired.

It is preferable to further include: a retainer which stabilizes the USB device connected to the USB connecting terminal.

According to the aspect of the invention, the USB device can be fixed by the retainer in a condition in which the USB device is connected to the USB connecting terminal. As such, it is possible to reliably prevent the USB device from dropping off the electronic instrument during the carrying about of the electronic instrument. Consequently, it is possible to prevent the portability of the electronic instrument from being impaired due to the connection of the USB device.

It is preferable that the step is formed in a lowest temperature position of the apparatus body.

It should be noted that there are many kinds of USB device having a semiconductor or the like furnished therein and, while the USB device is in use, heat is generated from the USB device itself too. When heat is applied to this kind of USB device from an exterior, a malfunction occurs, and normal use of the USB device may become impossible.

In response to this, according to the aspect of the invention, the step is formed in the lowest temperature position of the apparatus body configuring the electronic instrument. As such, it is possible to reduce an influence of heat generated in the electronic instrument on the USB device connected to the USB connecting terminal. Consequently, it is possible to reduce the malfunction of the USB device connected to the electronic instrument.

It is preferable that the electronic instrument is a projector including: a light source; an optical modulator which forms an optical image by modulating a luminous flux emitted from the light source; and a projection optical system which projects the formed optical image.

According to the aspect of the invention, in a case in which a USB device storing image information such as an image file, or a USB device equipped with a module capable of a communication connection to another device, is connected to the projector serving as the electronic instrument, it is possible to carry the projector along without impairing the portability. Consequently, it is possible to easily carry the projector along, enabling a prevention of an impairment of the portability of the projector.

It is preferable that the step is formed in a surface of the housing which is along a direction of projection of the optical image by the projection optical system, and is on a side proximate to the projection optical system.

At this point, in a case in which the electronic instrument is configured as the projector, as the projection optical system which enlarges and projects the optical image requires a certain length, and the heat generated in the projection optical system itself is low, the surface of the housing which is along the direction of projection by the projection optical system, and is on the side proximate to the projection optical system, is the lowest temperature position of the electronic instrument. For this reason, according to the aspect of the invention, by the step being formed on the surface of the housing which is along the direction of projection of the optical image by the projection optical system, it is possible to inhibit the heat generated in the electronic instrument from being transmitted to the USB device connected to the USB connecting terminal. Consequently, it is possible to further reduce the malfunction of the USB device connected to the USB connecting terminal of the electronic instrument configured as the projector.

Also, according to another aspect of the invention, a USB device, being used for an electronic instrument equipped with a housing including a step sinking in toward an interior and a USB connecting terminal provided in the step, is connected to the USB connecting terminal. The USB device, when connected to the USB connecting terminal, has a shape fitting the housing.

According to the aspect of the invention, it is possible to produce the same advantageous effects as those of the heretofore described electronic instrument.

That is, in a case in which the USB device according to the aspect of the invention is connected to the USB connecting terminal provided in the step of the housing of the electronic instrument, a formation is such that the USB device is housed in the housing. Also, as the USB device, when connected to the USB connecting terminal, has a shape fitting a shape of the housing of the electronic instrument, it is possible to reliably prevent the USB device from projecting from the electronic instrument. Consequently, it is possible, even in a condition in which the USB device is connected, to prevent the portability of the electronic instrument from being impaired.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, a description will be given, based on the drawings, of an embodiment of the invention.

1. Configuration of Projector 1

Figure 1:
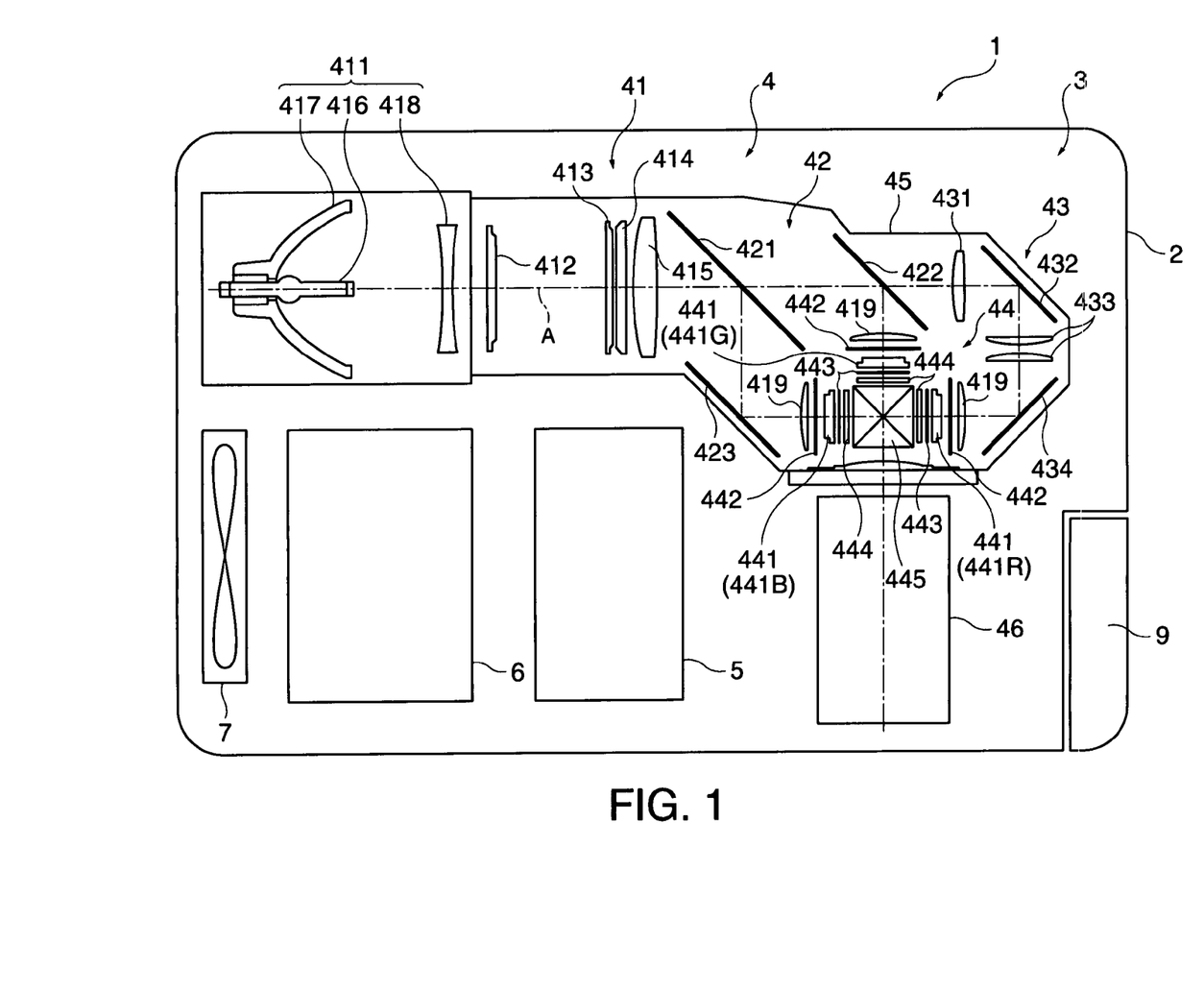
FIG. 1 is a schematic diagram showing an internal configuration of a projector according to an embodiment of the invention.

FIG. 1 is a schematic diagram showing an internal configuration of a projector 1 according to the embodiment.

The projector 1 forms an optical image corresponding to received image information, and enlarges and projects the optical image onto a screen or the like. As shown in FIG. 1, the projector 1 includes an exterior housing 2 and an apparatus body 3 housed in the exterior housing 2. Also, the projector 1 is configured in such a way that a USB device 9 can be connected to a side surface, which is along a direction of projection of the optical image by a projection lens 46 to be described hereafter, and is on a side proximate to the projection lens 46, along the direction of projection.

2. Configuration of Apparatus Body 3

The apparatus body 3 executes a main function of the projector 1 and, as described heretofore, is housed in the exterior housing 2. The apparatus body 3 is configured to include an optical unit 4 which forms the optical image, a control unit 5 which controls an operation of the apparatus body 3, a power supply unit 6 which supplies a drive electric power to each electronic part configuring the apparatus body 3, and a cooling unit 7 which cools them.

The optical unit 4 is a unit which, under a control by the control unit 5 to be described hereafter, optically processes a luminous flux emitted from a light source, and forms an optical image (a color image) corresponding to the image information. The optical unit 4 has a substantially L shape in plan view which, as well as extending along a back surface of the exterior housing 2, extends along two side surfaces of the exterior housing 2.

The optical unit 4 includes an illumination optical device 41, a color separation optical device 42, a relay optical device 43, an electro-optic device 44, an optical part housing 45 which houses and disposes the optical components 41 to 44 in an interior, and the projection lens 46 which is supported and fixed in a prescribed position by the optical part housing 45.

The illumination optical device 41 is an optical system for substantially uniformly illuminating image formation areas of liquid crystal panels 441, to be described hereafter, configuring the electro-optic device 44. The illumination optical device 41 is configured to include a light source device 411, a first lens array 412, a second lens array 413, a polarization converter 414, and a superimposing lens 415.

The light source device 411 includes a light source lamp 416 which emits a radial light ray, a reflector 417 which reflects a radiant light emitted from the light source lamp 416 and causes it to converge on a prescribed position, and a parallelization concave lens 418 which makes a luminous flux caused to converge by the reflector 417 parallel to an illumination optical axis A. As this kind of light source lamp 416, it is possible to use a tungsten halogen lamp, a metal halide lamp or a high pressure mercury-vapor lamp. Also, the reflector 417, apart from being configurable of an ellipsoidal reflector having an ellipsoid of revolution, can also be configured of a parabolic reflector having a paraboloid of revolution. In this case, it is possible to omit the parallelization concave lens 418.

The first lens array 412 has a configuration in which small lenses having a contour substantially rectangular as seen from a direction of the optical axis are arrayed in a matrix form. The individual small lenses divide the luminous flux emitted from the light source device 411 into a plurality of partial luminous fluxes.

The second lens array 413, having the same configuration as the first lens array 412, has a configuration in which small lenses are arrayed in a matrix form. The second lens array 413 has a functin of, in conjunction With the superimposing lens 415 disposed in a downstream stage of an optical path of the second lens array 413, focusing an image emerging from each small lens of the first lens array 412 onto each of the image formation areas of the liquid panels 441, to be described hereafter, of the electro-optic device 44.

The polarization converter 414, being disposed between the second lens array 413 and the superimposing lens 415, converts the lights from the second lens array 413 into lights having substantially one kind of linear polarization.

Specifically, the individual partial lights converted to have the substantially one kind of linear polarization by the polarization converter 414 are finally substantially superimposed onto each of the image formation areas of the liquid crystal panels 441, to be described hereafter, by the superimposing lens 415. In a projector using a liquid crystal panel of a type modulating a polarized light, as it is possible to use only one kind of polarized light, it is impossible to use substantially half the light from the light source device 411 emitting a random polarized light. For this reason, by using the polarization converter 414, the emergent light from the light source device 411 is converted to have the substantially one kind of linear polarization, thus increasing a light use efficiency in the electro-optic device 44.

The color separation optical device 42, including two dichroic mirrors 421 and 422 and a reflecting mirror 423, has a function of causing the dichroic mirrors 421 and 422 to separate the plurality of partial luminous fluxes emitted from the illumination optical device 41 into color lights of three colors, red, green and blue.

The relay optical device 43, including an incidence side lens 431, relay lenses 433 and reflecting mirrors 432 and 434, has a function of leading the red light separated by the color separation optical device 42 to a red light liquid crystal panel 441 (441R).

At this time, the dichroic mirror 421 of the color separation optical device 42 transmits a red light component and a green light component of the luminous flux emitted from the illumination optical device 41, and reflects a blue light component. The blue light reflected by the dichroic mirror 421 is reflected off the reflecting mirror 423, passes through a field lens 419, and reaches a blue light liquid crystal panel 441 (441B). The field lens 419 converts the individual partial luminous fluxes emerging from the second lens array 413 into a luminous flux parallel to a central axis (a principal ray) of the partial luminous fluxes. The same applies to the field lens 419 provided on a light incidence side of each of a green light 441 (441G) and the red light liquid crystal panels 441 (441R).

Of the red light and the green light transmitted through the dichroic mirror 421, the green light is reflected by the dichroic mirror 422, passes through the field lens 419, and reaches the green light liquid crystal panel 441 (441G). Meanwhile, the red light is transmitted through the dichroic mirror 422, passes through the relay optical device 43 and further through the field lens 419, and reaches the red light liquid crystal panel 441 (441R). The reason for the relay optical device 43 being disposed on an optical path of the red light is, as a length of the optical path of the red light is longer than that of the other color lights, to prevent the light use efficiency from decreasing due to a diffusion of light and the like. That is, it is because partial luminous fluxes incident on the incidence side lens 431 are transmitted intact to the field lens 419. The relay optical device 43 is configured in such a way as to transmit the red light among the three color lights but, without being limited to this, it is also acceptable to configure in such a way as to transmit, for example, the blue light.

The electro-optic device 44 modulates each of the three color lights emerging from the color separation optical device 42 in accordance with the image information and, by synthesizing each modulated color light, forms the color image (color image). The electro-optic device 44 is configured to include the three liquid crystal panels 441 (the red light liquid crystal panel is designated by 441R, the green light liquid crystal panel by 441G and the blue light liquid crystal panel by 441B), three incidence side polarizing plates 442 disposed one on each of luminous flux incidence sides of the liquid crystal panels 441, three view angle compensating plates 443 disposed one on each of luminous flux emergence sides of the liquid crystal panels 441, three emergence side polarizing plates 444 disposed one on each of luminous flux emergence sides of the three view angle compensating plates 443, and a cross dichroic prism 445 serving as a color synthesizing optical device.

Of them, each of the incidence side polarizing plates 442 has each color light uniformed in substantially one polarization direction by the polarization converter 414 fall incident thereon, transmits only a polarized light, among the incident luminous fluxes, having substantially the same direction as the polarization axis of the luminous fluxes uniformed by the polarization converter 414, and absorbs the other luminous fluxes. The incidence side polarizing plates 442 have, for example, a configuration in which a polarizing film is affixed onto a light transmissive substrate made of sapphire glass, crystal or the like.

Each of the liquid crystal panels 441, having a configuration in which a liquid crystal which is an electro-optic material is hermetically sealed between a pair of transparent glass substrates, controls an orientation of the liquid crystal in the image formation area in accordance with a drive signal received from the control unit 5 to be described hereafter, modulates a polarization direction of the polarized luminous flux emerging from the incidence side polarizing plate 442, and forms a color image corresponding to an incident color light.

Each of the view angle compensating plates 443 is formed as a film and, in a case in which a luminous flux falls incident obliquely on the liquid crystal panel 441 (falls incident at a slant with respect to a normal direction of a luminous flux incidence surface of the liquid crystal panel 441), compensates a phase difference occurring between an ordinary ray and an extraordinary ray due to a birefringence occurring in the relevant liquid crystal panel 441. Each of the view angle compensating plates 443, being an optical anisotropic body having a negative uniaxiality, is oriented in such a way that its optical axis faces a described direction in a film plane and inclines at a prescribed angle in an out-of-plane direction from the film plane.

The View angle compensating plate 443 can be configured of, for example, a material in which a discoid compound layer is formed on a transparent support body made of triacetylcellulose (TAC) or the like via an oriented film, and a WV film (from Fuji Photo Film Co., Ltd.) can be employed as the material.

Each of the incidence side polarizing plates 444 transmits only a luminous flux, among the luminous fluxes which emerge from the liquid crystal panel 441 and pass through the view angle compensating plate 443, having a polarizing axis perpendicular to a transmission axis of the luminous flux in the incidence side polarizing plate 442, and absorbs the other luminous fluxes.

The cross dichroic prism 445 is an optical element which synthesizes the color lights provided as color images emerging from the emergence side polarizing plates 444, and forms the optical image (color image). The cross dichroic prism 445 is formed in a square shape in plan view with four right angle prisms stuck together, and two dielectric multilayers are formed on interfaces obtained by sticking the right angle prisms together. The dielectric multilayers transmit a color light passing through the emergence side polarizing plate 444 disposed on a side (a G color light side) opposite the projection lens 46, and reflect color lights passing through the remaining two emergence side polarizing plates 444 (on an R color light side and a B color light side) In this way, each color light modulated by each incidence side polarizing plate 442, each liquid crystal panel 441, each view angle compensating plate 443 and each emergence side polarizing plate 444 is synthesized to form the color image.

The optical part housing 45 is a plastic box-like member in the interior of which, the prescribed illumination optical axis A being set, the heretofore described optical components 41 to 44 are disposed in prescribed positions with respect to the illumination optical axis A. Although not shown in detail, a plurality of grooves in which to position and secure the individual optical components 41 to 44 is formed in the interior of the optical part housing 45.

The projection lens 46 has a function as a projection optical system which enlarges and projects the optical image (color image) formed by the optical components 41 to 44 on the not-shown screen. The projection lens 46 is configured as a combination lens having a plurality of lenses contained in a tubular lens barrel.

The control unit 5 is configured as a circuit board having mounted thereon a CPU (Central Processing Unit), an ROM (Read Only Memory), an RAM (Random Access Memory) and the like. The control unit 5 carries out a drive control of a whole of the apparatus body 3, such as processing the image information received from a connecting terminal (not shown) exposed to an outer side of the exterior housing 2 and, as well as controlling a drive of the liquid crystal panels 441 of the optical unit 4, controlling a lighting of the light source lamp 416 of the light source device 411. Also, the control unit 5, being electrically connected to a USB connecting terminal 21B2 to be described hereafter (refer to FIGS. 3 to 5), processes information received from the USB device 9 connected to the USB connecting terminal 21B2.

The power supply unit 6 supplies an electric power to each electronic part configuring the projector 1 and, although not shown in detail, includes a power supply block and a light source drive block.

Of them, the power supply block converts a commercial alternating current received via a power cable (not shown) into a direct current and, after increasing and reducing its voltage to a voltage corresponding to each electronic part, supplies it to each electronic part such as the light source drive block and the control unit 5.

The light source drive block is a circuit board which rectifies and converts the direct current supplied from the power supply block, generates an AC rectangular wave current, supplies the AC rectangular wave current to the light the light source lamp 416. The light source drive block is electrically connected to the control unit 5, and the lighting of the light source lamp 416 is controlled by the control unit 5 via the light source drive block.

The cooling unit 7 takes in air from an exterior of the exterior housing 2, and discharges the air which has cooled the optical unit 4, the control unit 5 and the power supply unit 6 to the exterior. The cooling unit 7 is configured to include a cooling fan, and a drive control of the cooling fan is carried out by the control unit 5. This kind of cooling fan can be configured by an axial flow fan which, by being rotated around a rotary shaft, takes in and discharges air along a direction of the rotary shaft, and can also be configured by a centrifugal fan (a sirocco fan) which takes in air from the direction of the rotary shaft and discharges the air in a tangential direction of rotation.

3. Configuration of Exterior Housing 2

Figure 2:
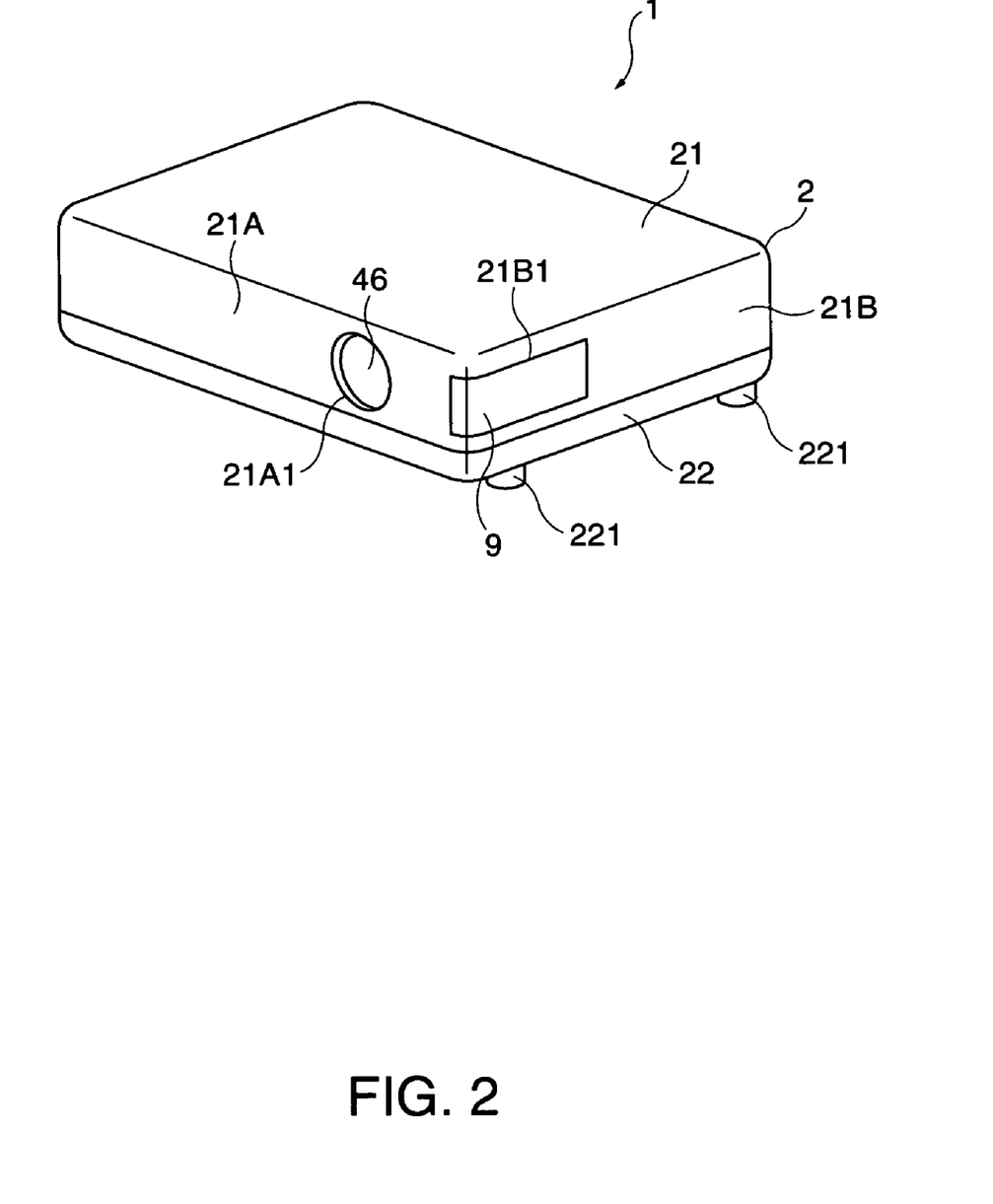
FIG. 2 is a schematic perspective view showing an external appearance of the projector according to the embodiment.

FIG. 2 is a schematic perspective view showing an external appearance of the projector 1. In other words, FIG. 2 is a schematic perspective view showing the exterior housing 2.

The exterior housing 2 corresponds to a housing of the invention and, as shown in FIG. 2, is formed of plastics or the like into a rounded, totally substantially rectangular parallelepiped shape. The exterior housing 2 is configured of an upper casing 21 which configures a top surface, a front surface, a back surface and side surfaces of the projector 1, configuring an upper portion of the exterior housing 2, and a lower casing 22 which configures a bottom surface, a front surface, a back surface and side surfaces of the projector 1, configuring a lower portion of the exterior housing 2. The upper casing 21 and the lower casing 22 are fixed together by a screw or the like.

A material of the exterior housing 2 not being limited to plastics or the like, it is acceptable that it is formed of another material, and it is also acceptable that it is configured of, for example, metal or the like.

Of the upper and lower casings 21 and 22, foots 221 extending downward from the bottom surface of the lower casing 21 are formed at four corners of the bottom surface.

Also, an opening 21A1 from which the projection lens 46 is exposed is formed in a front surface 21A (a surface facing a direction of projection of the optical image by the projection lens 46) of the upper casing 21.

Furthermore, a step 21B1, extending along the direction of projection of the optical image by the projection lens 46, to which the USB device 9 to be described hereafter is attached, is formed in a side surface 21B, of the side surfaces configuring the upper casing 21, on the side proximate to the projection lens 46.

Figure 3:
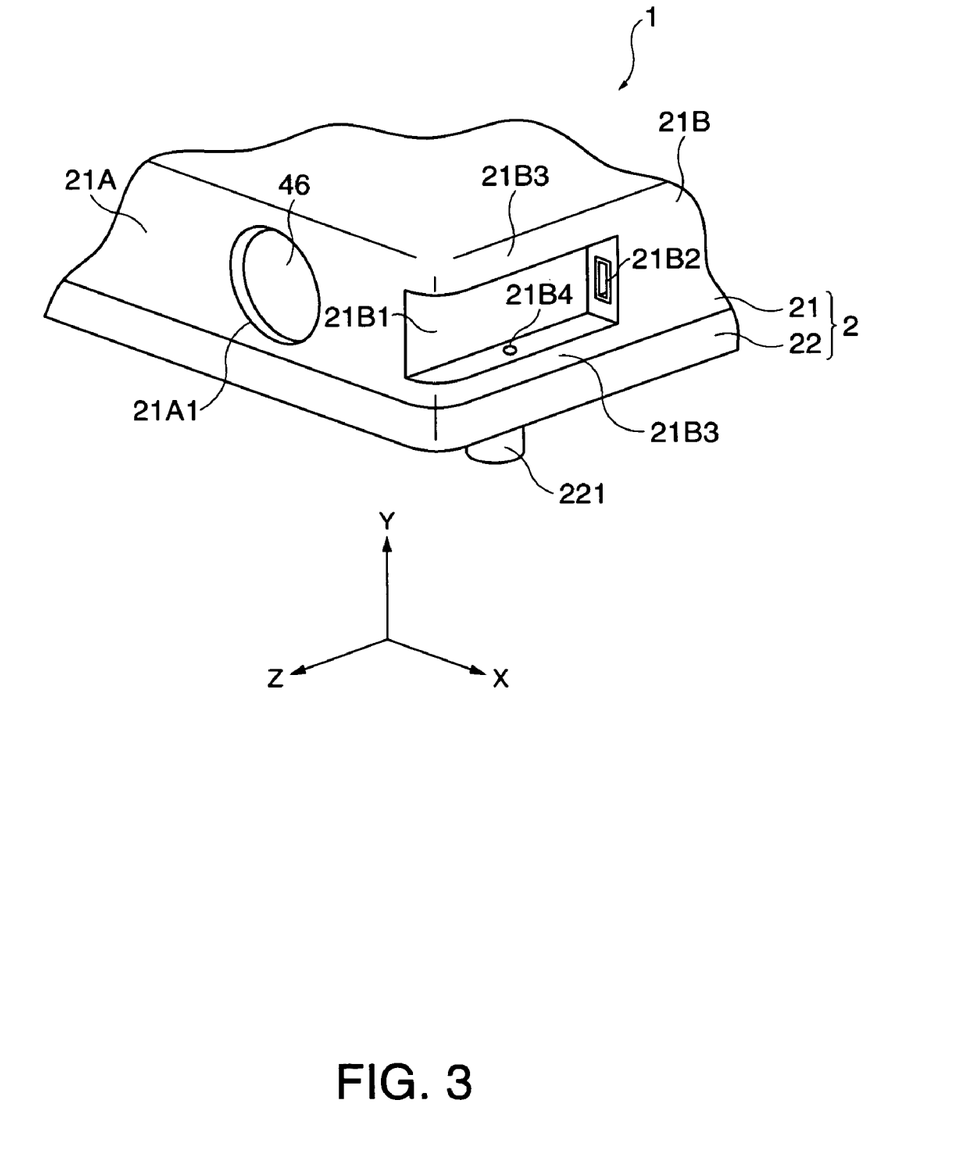
FIG. 3 is a schematic perspective view showing in enlarged dimension a step of an exterior housing according to the embodiment.

FIG. 3 is a partial enlarged view showing in enlarged dimension a part of the exterior housing 2. In other words, FIG. 3 is a schematic perspective view showing the step 21B1 formed in the upper casing 21.

As shown in FIG. 3, the step 21B1 is formed in a substantially recessed shape in vertical section in such a way as to sink in toward an inner side of the upper casing 21 and extend along the direction of projection of the optical image by the projection lens 46 (an arrow Z direction in FIG. 3). The step 21B1 is formed in such a way that a dimension along a normal direction of the side surface of the exterior housing 2 (an arrow X direction in FIG. 3) is shorter than a dimension along the arrow Z direction. Also, an end of the step 21B1 on the front surface 21A side is notched, and the USB connecting terminal 21B2 to which the USB device 9 is connected is provided in a back surface forming the step 21B1 in such a way that it is exposed.

Also, sidewalls 21B3 extending along the arrow Z direction are formed one on each of an upper side (a distal end side in a arrow Y direction in FIG. 3) and a lower side (a proximal end side in the arrow Y direction in FIG. 3). The sidewalls 21B3, as well as protecting the USB device 9 which is inserted in the step 21B1 and connected to the USB connecting terminal 21B2, function as a guide which guides the USB device 9 to the USB connecting terminal 21B2. For this reason, it is possible not only to easily carry out a connection of the USB device 9 to the USB connecting terminal 21B2 but also, when the USB device 9 is connected to the USB connecting terminal 21B2, to prevent the USB device 9 from projecting from the exterior housing 2, meaning that it is possible to restrict a portability of the projector 1 from being impaired.

Furthermore, the sidewall 21B3 positioned on the lower side of the step 21B1 is formed with a hole 21B4 passing vertically through the relevant sidewall 21B3. The hole 21B4 is a hole through which is inserted a screw 8, to be described hereafter, by which the USB device 9 is fixed to the step 21B1.

4. Configuration of USB Device 9

Figure 4:
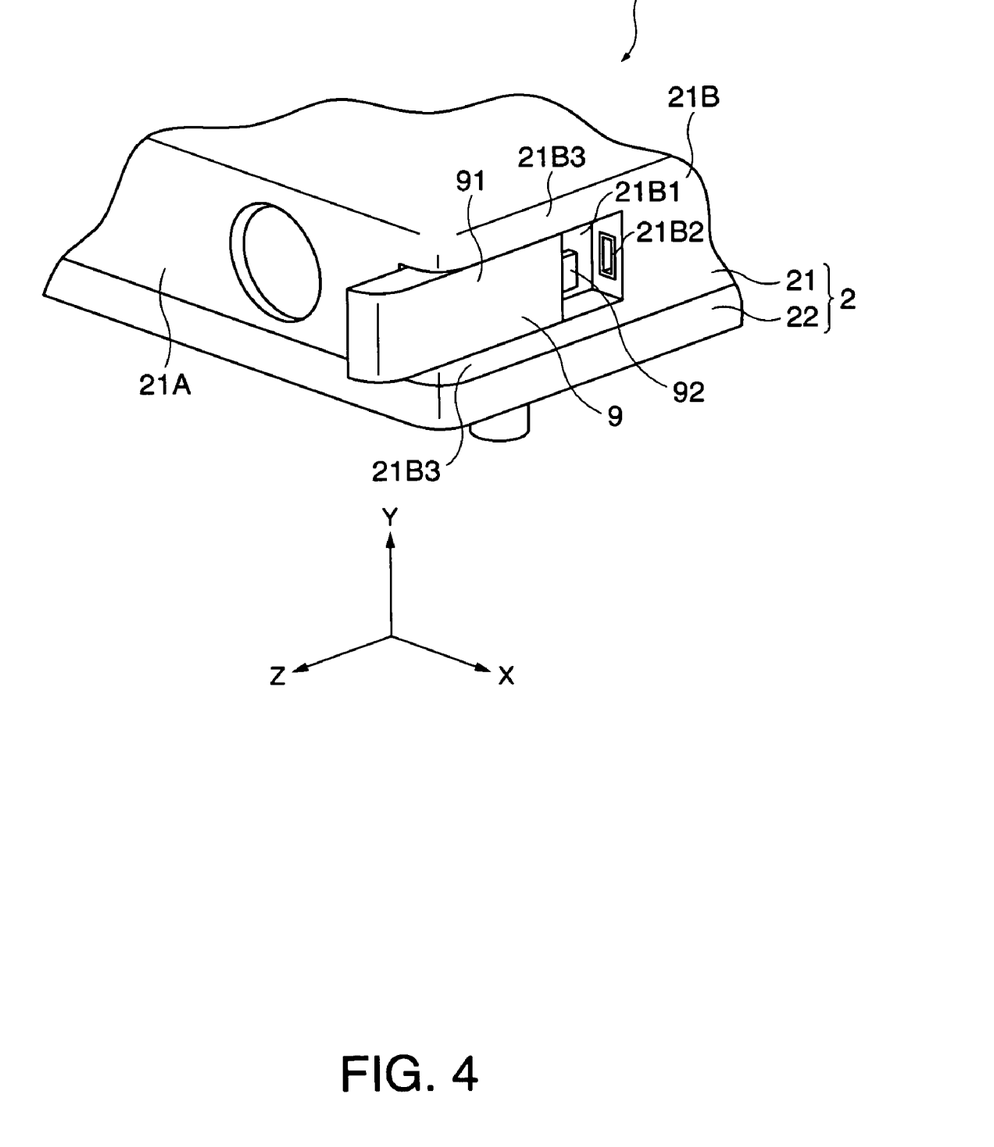
FIG. 4 is a schematic perspective view of the step and a USB device according to the embodiment as seen from above.
Figure 5:
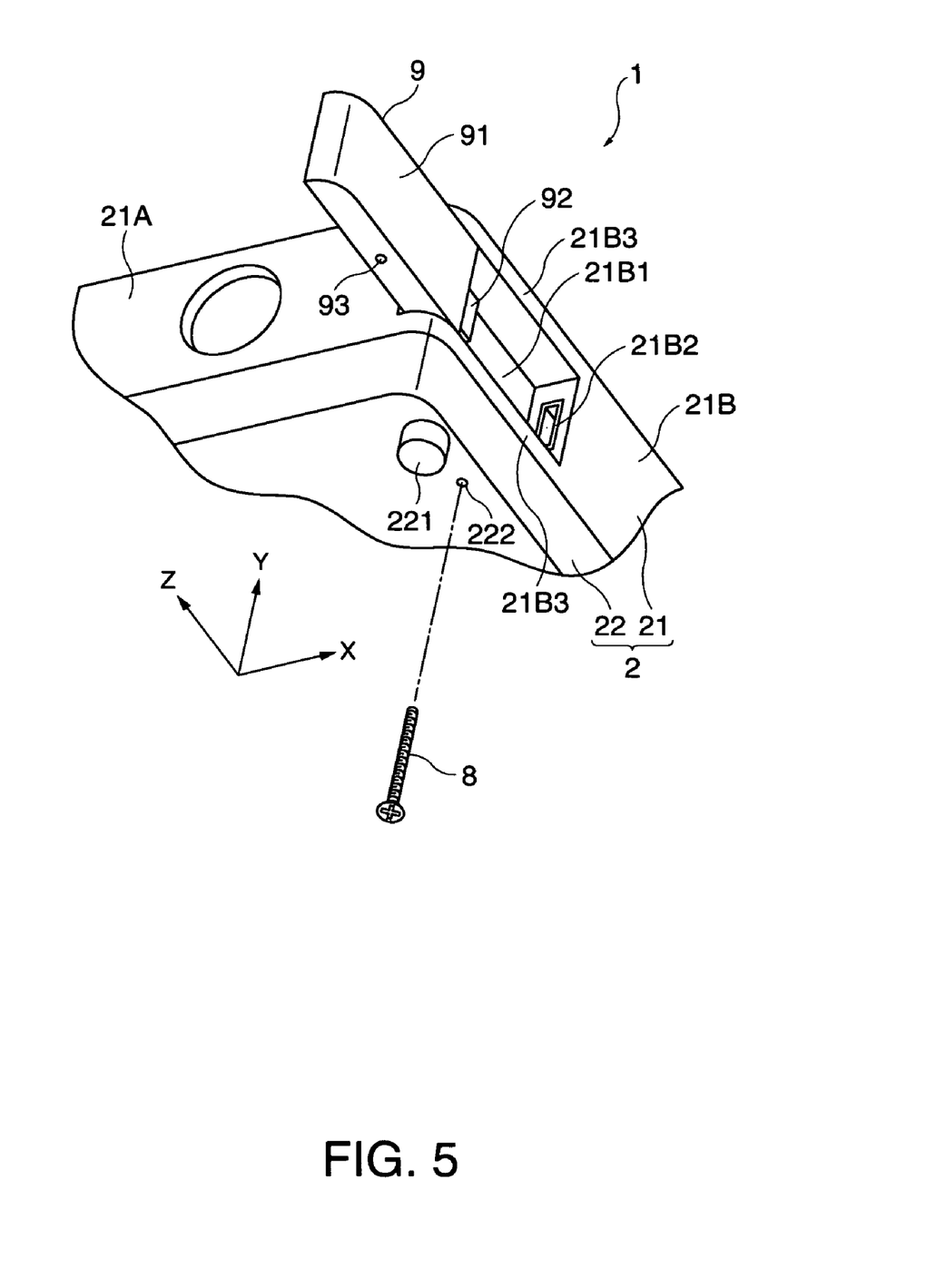
FIG. 5 is a schematic perspective view of the step and the USB device according to the embodiment as seen from below.
Figure 6:
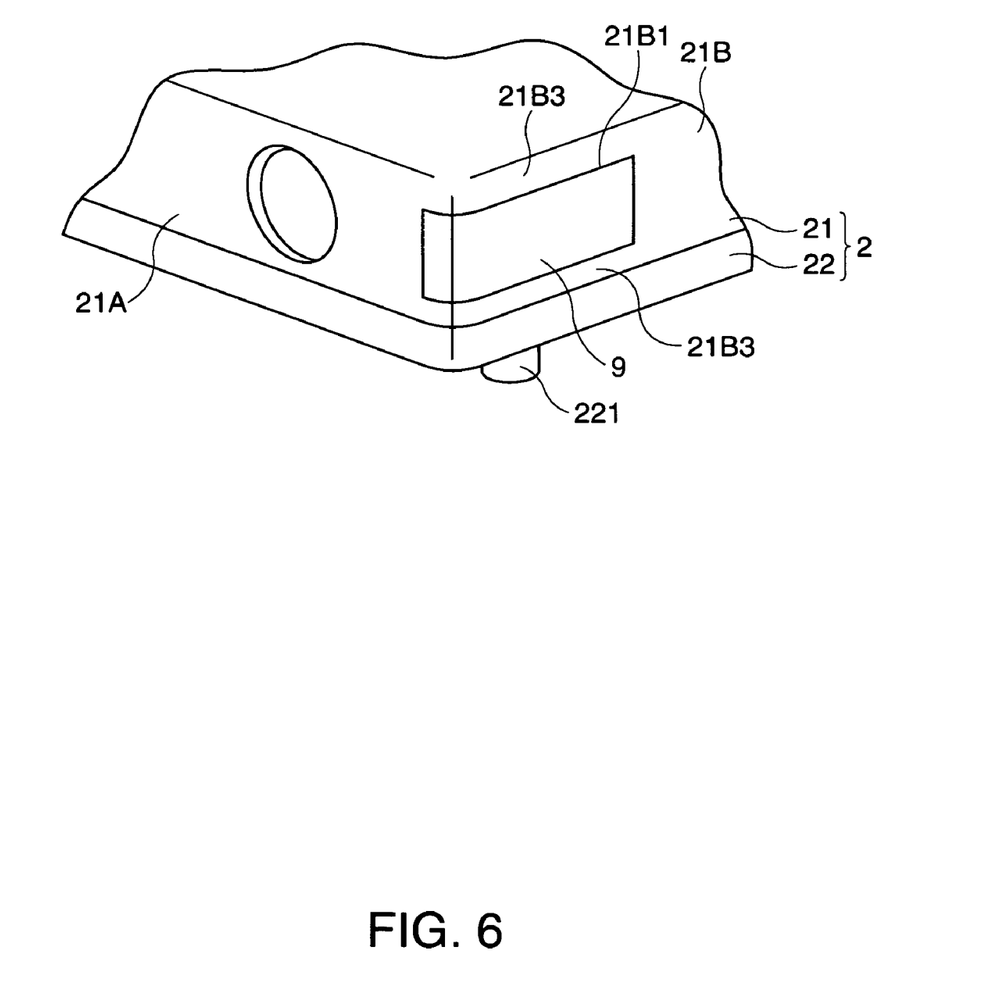
FIG. 6 is a schematic perspective view showing the step and the USB device according to the embodiment.

FIGS. 4 and 5 are views showing a process in which the USB device 9 is attached to the step 21B1. Specifically, FIG. 4 is a view of the step 21B1 and the USB device 9 as seen from above, and FIG. 5 is a view of them as seen from below. Also, FIG. 6 is a view showing a condition in which the USB device 9 is connected to the USB connecting terminal 21B2. X, Y and Z directions shown in FIGS. 4 and 5 are the same as the X, Y and Z directions shown in FIG. 3.

As shown in FIGS. 4 to 6, the USB device 9, being a compact and portable USB device, is configured in such a way as to be connectable directly to the USB connecting terminal 21B2 provided in the step 21B1 without going through a USB connection cable. As an example of this kind of USB device 9, it is possible to suggest, for example, a wireless LAN adaptor equipped with a wireless LAN (Local Area Network) module capable of a communication connection to an external device, or a USB memory storing a still image file and an animated image file as the image information.

The USB device 9 is configured to include a substantially rectangular parallelepiped device body 91 configured in such a way as to be able to store information therein, and a terminal 92 protruding from the device body 91 and connected to the USB connecting terminal 21B2.

Of them, a shape of the device body 91 is formed in such a way as to fit a shape of the upper casing 21 when the terminal 92 is connected to the USB connecting terminal 21B2. Specifically, the shape of the device body 91 is formed in such a way that a surface of the device body 91 exposed to an exterior when the USB device 9 is connected to the USB connecting terminal 21B2 has a substantially central portion substantially flattened along the side surface 21B, and that a surface proximate to an end opposite an end at which the terminal 92 of the device body 91 is formed has a curved surface shape in conformity with the front surface 21A and the side surface 21B of the upper casing 21.

Then, the shape of the device body 91 is formed in such a way that a dimension of the device body 91 in the arrow X direction is substantially the same as a dimension of the step 21B1 in the arrow X direction, and that a dimension of the device body 91 in the arrow Y direction is substantially the same as a dimension between the sidewalls 21B3. Furthermore, the shape of the device body 91 is formed in such a way that a dimension of the device body 91 in the arrow Z direction (a dimension in the arrow Z direction of a portion of the USB device 9 except the terminal 92) is substantially the same as a dimension of the step 21B1 in the arrow Z direction. For this reason, in the case in which the USB device 9 is connected to the USB connecting terminal 21B2, as shown in FIG. 6, the USB device 9 is housed in the step 21B1 and prevented from projecting from the upper casing 21.

A screw hole 93 is formed in a lower surface (a surface facing the arrow Y direction in FIG. 5) of the device body 91. The screw 8 acting as a retainer, which has been inserted through a hole 21B4 formed in the lower sidewall 21B3 of the upper casing 21 and a hole 222 formed in the bottom surface of the lower casing 22, is screwed into the screw hole 93. That is, after the USB device 9 is connected to the USB connecting terminal 21B2, by screwing the screw 8 into the screw hole 93 via the hole 21B4 and the hole 222, it is possible to fix the USB device 9 to the exterior housing 2. Consequently, as the USB device 9 is prevented from coming off even in a case of carrying the projector 1 with the USB device 9 connected to the projector 1, apart from it being possible to prevent damage to the USB device 9 from occurring, it is possible not to impair the portability of the projector 1, but rather to improve an ease of carrying about.

5. Step 21B1 Formation Position

At this point, a description will be given of a position of formation of the step 21B1 in the upper casing 21.

As described heretofore, the step 21B1 is formed in the side surface 21B, of the surfaces configuring the upper casing 21, which is along the direction of projection of the optical image by the projection lens 46 and is on the side proximate to the projection lens 46. Then, a position of the side surface 21B in which the step 21B1 is formed is a lowest temperature position of the projector 1.

To describe in detail, in the apparatus body 3, the optical unit 4, the control unit 5 and the power supply unit 6 are all heat generating sources and, particularly, the light source lamp 416 configuring the optical unit 4 is the highest heat generating source. For this reason, in order to connect the USB device 9 to the projector 1, unless the USB device 9 is connected to a position away from these heat generating sources, it is likely that the USB device 9 malfunctions under an influence of heat from the heat generating sources. Particularly, in the event of the projector 1 having a configuration in which the USB device 9 is housed in the step as in the embodiment, heat may be transmitted from the exterior housing 2 to the USB device 9, in which case it is more likely that the USB device 9 malfunctions. Consequently, it is necessary that the step in which the USB device 9 is housed is disposed in the lowest temperature position of the exterior housing.

At this point, among disposition positions of the units 4, 5, 6 and 7 shown in FIG. 1, high temperature positions of the projector 1 are proximate to the light source device 411 of the optical unit 4, proximate to the electro-optic device 44, and proximate to the control unit 5, the power supply unit 6 and the cooling unit 7. Also, in the position in which the cooling unit 7 is disposed, as it requires an opening for discharging air inside the exterior housing 2 to the exterior, it is difficult to provide the USB connecting terminal for connecting the USB device 9. For this reason, a position of the side surface 21B, being least affected by the heat of the optical unit 4, control unit 5, power supply unit 6 and cooling unit 7, which is along the projection lens 46 and on the side proximate to the projection lens 46, is the lowest temperature position of the projector 1. Then, by forming the step 21B1 in a position of the side surface 21B corresponding to the projection lens 46, and providing the USB connecting terminal 21B2 in the step 21B1, it is possible to minimize the influence of the heat generated in the projector 1 on the USB device 9. Consequently, it is possible to suppress an occurrence of the malfunction of the USB device 9 connected to the USB connecting terminal 21B2.

According to the above projector 1 of the embodiment, it is possible to produce the following advantageous effects.

That is, the step 21B1 sinking in toward the inner side is formed in the side surface 21B of the exterior housing 2 configuring the projector 1, and the USB connecting terminal 21B2 to which the USB device 9 is connected along the step 21B1 is provided in the step 21B1. As such, in the case in which the USB device 9 is connected to the USB connecting terminal 21B2, it is possible to prevent the USB device 9 from projecting unnecessarily from the upper casing 21. Consequently, as it is possible, when the projector 1 is carried about; to prevent the USB device 9 from becoming impeditive, it is possible to prevent the portability of the projector 1 from being impaired.

Also, the sidewalls 21B3, which are adjacent to the step 21B1 and extend along the direction of connection of the USB device 9 to the USB connecting terminal 21B2, are provided on the side surface 21B of the upper casing 21 in which the step 21B1 is formed. As such, as the connection of the USB device 9 to the USB connecting terminal 21B2 is guided, it is possible to easily carry out the connection of the USB device 9.

Also, as the USB device 9 is protected by the sidewalls 21B3, it is possible not only to prevent the USB device 9 from dropping off abruptly, but to further restrict the USB device 9 from projecting from the upper casing 21. Consequently, it is possible to improve the portability of the projector 1 with the USB device 9 connected thereto.

Furthermore, in the embodiment, the sidewalls 21B3 are formed above and below the step 21B1 in such a way as to sandwich the step 21B1. As such, as well as it being easier to insert the USB device 9 in the USB connecting terminal 21B2, it is possible to reliably protect the USB device 9.

Further still, the step 21B1 provided with the USB connecting terminal 21B2 is formed in the side surface 21B of the upper casing 21 proximate to the projection lens 46. As such, as the position in which the step 21B1 is formed is the lowest temperature position of the projector 1, it is possible to prevent the heat generated by the projector 1 from being transmitted to the USB device 9 connected to the USB connecting terminal 21B2, and affecting the USB device 9. Consequently, it is possible to prevent the malfunction of the USB device 9.

Also, as the USB device 9 is connected to the USB connecting terminal 21B2 along a direction opposite the direction of projection of the optical image by the projection lens 46, it is possible to prevent an impediment to the projection of the optical image by the projection lens 46. For this reason, as a restriction is kept from being imposed on the position of the projection lens 46, it is possible to improve a freedom of designing the projector 1.

Furthermore, the USB device 9 to be connected to the USB connecting terminal 21B2, when connected to the USB connecting terminal 21B2, has a shape corresponding to the shape of the upper casing 21. As such, as the USB device 9 does substantially not project from the upper casing, even when the projector 1 is carried about with the USB device 9 connected thereto, the USB device 9 is prevented from becoming impeditive. Consequently, it is possible to further improve the portability of the projector 1.

6. Modifications of Embodiment

The invention is not limited to the heretofore described embodiment, and modifications, improvements and the like made within a scope capable of achieving the advantage of some aspects of the invention are included in the invention.

For example, in the heretofore described embodiment, the sidewalls 21B3 are formed above and below the step 21B1 along the direction of insertion of the USB device 9 in the step 21B1 in such a way as to sandwich the step 21B1, but the invention is not limited to this. That is, it is acceptable that the sidewall 21B3 is formed on only one side of (for example, below) the step 21B1, and it is also acceptable that no sidewall is formed.

As long as the sidewalls 21B3 extending along the direction of insertion of the USB device 9 are formed at one end of the step 21B1 in the direction of insertion, it is possible to protect the USB device 9 connected to the USB connecting terminal 21B2 during the carrying about of the projector 1. Also, by the sidewall 21B3 being formed below the step 21B1, the insertion of the USB device 9 in the USB connecting terminal 21B2 is guided, enabling an easier connection of the USB device 9.

Also, in the heretofore described embodiment, the dimension in the arrow X direction (refer to FIGS. 3 to 5) of the sidewalls 21B3 from a bottom surface of the step 21B1 is made substantially the same as the dimension in the arrow X direction of the device body 91 of the USB device 9, but the invention is not limited to this. In a case in which the dimension in the arrow X direction of the sidewalls 21B3 from the bottom surface of the step 21B1 is formed to be equal to or greater than the dimension of the device body 91 in the arrow X direction, it being possible to eliminate the projection of the USB device 9 from the upper casing 21, it is possible to improve the portability of the projector 1.

In the heretofore described embodiment, the step 21B1 is formed in the side surface 21B, of the side surfaces along the direction of projection of the optical image by the projection lens 46, proximate to the projection lens 46 but, as long as a step is formed in a position which does not interrupt the projection of the optical image by the projection lens 46, the discharge of the cooling air by the cooling unit 7, and the like, any position of formation of the step is acceptable. Furthermore, the position of the side surface 21B in which the step 21B1 is formed is the position corresponding to the projection lens 46, but the invention is not limited to this.

In the heretofore described embodiment, the step 21B1 is formed in the side surface 21B of the upper casing 21 in such a way as to extend along the direction of projection of the optical image by the projection lens 46 (the Z direction in FIGS. 3 to 5), but the invention is not limited to this. For example, it is acceptable that the step 21B1 is formed in such a way as to extend in the X direction or the Y direction in FIGS. 3 to 5.

In the heretofore described embodiment, a configuration is described in which the optical unit 4 has the substantially L shape in plan view but, without being limited to this, for example, it is acceptable to employ a configuration having a substantially U shape in plan view.

In the heretofore described embodiment, the transmissive liquid crystal panels 441 with differing luminous flux incidence surfaces and luminous flux emergence surfaces are used, but it is acceptable to use reflective liquid crystal panels with identical light incidence surfaces and light emergence surfaces.

Furthermore, in the projector 1 of the heretofore described embodiment, the three liquid crystal panels 441R, 441G and 441B are used, but the invention is not limited to this. That is, the invention is also applicable to a projector using two or four or more liquid crystal panels.

In the heretofore described embodiment, the projector 1 equipped with the liquid crystal panels 441 is illustrated as an optical modulator, but it is acceptable to employ an optical modulator of another configuration as long as it forms an optical image by modulating an incident luminous flux in accordance with image information. For example, it is also possible to apply the invention to a projector using an optical modulator other than a liquid crystal layer, such as a device using an organic EL (ElectroLuminescence) or a micromirror. In a case of using this kind of optical modulator, it is possible to omit the polarizing plates 442 and 444 on the luminous flux incidence side and the luminous flux emergence side.

In the heretofore described embodiment, the projector 1 is proposed as an electronic instrument in which the USB connecting terminal 21B2 is provided, and the step 21B1 is formed, but the invention is not limited to this. That is, an electronic instrument of another configuration is acceptable as long as it is equipped with a USB connecting terminal. It is also possible to apply the invention to, for example, a PC (Personal Computer), a printer and the like. Particularly, in a case of an electronic instrument, such as a laptop PC, which is expected to be carried along, by applying the invention to it, it is possible, even with a USB device connected thereto, to restrict a portability of the electronic instrument from being impaired.

The invention, apart from being usable for a projector, can be suitably used for an electronic instrument, particularly an electronic instrument which is equipped with a USB connecting terminal to which a USB device can be connected, and is likely to be used by carrying it along, such as, for example, a laptop PC or a portable printer.

The entire disclosure of Japanese Patent Application No. 2006-019204, filed Jan. 27, 2006 is expressly incorporated by reference herein.

What is claimed is:

1. An electronic instrument comprising:
    an apparatus body which processes information received from a USB device connected thereto;
    a housing which houses the apparatus body in an interior; and
    a retainer comprising a screw extending through a hole formed in the housing, wherein
        a step sinking in toward an interior of the housing is formed in an outer peripheral surface of the housing,
        the step is provided with a USB connecting terminal to which the USB device is connected along the surface of the housing in which the step is formed, and
        the screw stabilizes the USB device connected to the USB connecting terminal.

2. The electronic instrument according to claim 1, wherein a sidewall extending along a connection direction of the USB device is formed, adjacent to the step, on the outer peripheral surface of the housing in which the step is formed.

3. The electronic instrument according to claim 1, wherein the step is formed in a lowest temperature position of the apparatus body.

4. The electronic instrument according to claim 1, wherein the electronic instrument is a projector including:
    a light source;
    an optical modulator which forms an optical image by modulating a luminous flux emitted from the light source; and
    a projection optical system which projects the formed optical image.

5. The electronic instrument according to claim 4, wherein the step is formed in a surface of the housing which is along a direction of projection of the optical image by the projection optical system, and is on a side proximate to the projection optical system.

6. The electronic instrument according to claim 1, wherein the screw extends into a screw hole formed in the USB device.

7. A USB device, being used for an electronic instrument equipped with a housing including a step sinking in toward an interior and a USB connecting terminal provided in the step, is connected to the USB connecting terminal, wherein
    the USB device, when connected to the USB connecting terminal, has a shape fitting the housing; and
    a retainer comprising a screw extending through a hole formed in the housing stabilizes the USB device when the USB device is connected to the USB connecting terminal.

* * * * *